(12) United States Patent
Park et al.

(10) Patent No.: US 7,048,619 B2
(45) Date of Patent: May 23, 2006

(54) RUBBING MACHINE WITH REALIGNING FUNCTIONS OF RUBBING CLOTH FOR USE IN LCD MANUFACTURING PROCESS AND RUBBING METHOD USING THE SAME

(75) Inventors: Chi Hyuck Park, Kyoungki-do (KR); Hyang Yul Kim, Kyoungki-do (KR); Tae Kyu Park, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 394 days.

(21) Appl. No.: 10/316,731

(22) Filed: Dec. 11, 2002

(65) Prior Publication Data

US 2003/0117574 A1    Jun. 26, 2003

(30) Foreign Application Priority Data

Dec. 22, 2001    (KR) ............... 10-2001-0083313

(51) Int. Cl.
*B24B 7/00*    (2006.01)
(52) U.S. Cl. .............. 451/64; 451/177; 451/178; 451/289; 451/260; 349/124; 349/126
(58) Field of Classification Search ............. 451/64, 451/177, 178, 289, 260; 349/124, 126
See application file for complete search history.

(56) References Cited

U.S. PATENT DOCUMENTS

| | | | |
|---|---|---|---|
| 5,478,682 A | 12/1995 | Nishikawa et al. | |
| 5,540,997 A | 7/1996 | Perettie et al. | |
| 5,730,899 A | 3/1998 | Ohnishi et al. | |
| 5,760,864 A * | 6/1998 | Yamada et al. | 349/187 |
| 5,773,559 A | 6/1998 | Miyamoto et al. | |
| 5,783,656 A | 7/1998 | Kimura et al. | |
| 5,850,272 A * | 12/1998 | Kabe et al. | 349/126 |
| 5,853,801 A | 12/1998 | Suga et al. | |
| 5,969,055 A | 10/1999 | Nishikawa et al. | |
| 6,224,788 B1 | 5/2001 | Ogawa et al. | |
| 6,462,796 B1 * | 10/2002 | Kabe et al. | 349/124 |
| 6,597,424 B1 * | 7/2003 | Hattori et al. | 349/146 |
| 6,853,426 B1 * | 2/2005 | Koike et al. | 349/126 |

* cited by examiner

*Primary Examiner*—Joseph J. Hail, III
*Assistant Examiner*—Shantese McDonald
(74) *Attorney, Agent, or Firm*—Ladas & Parry LLP

(57) ABSTRACT

The present invention relates to a rubbing machine with realigning functions for use in an LCD manufacturing process and also to a rubbing method which is conducted using the same. The rubbing machine is used to determine the direction of alignment by rubbing an alignment film coated on a substrate disposed on a stage. In this rubbing machine, an realigning section for realigning a rubbing cloth is disposed on the portion of a rubbing roll in such a manner that the realigning section be in contact with the rubbing cloth.

11 Claims, 4 Drawing Sheets

(a)   (b)

Rubbing roller progressing direction stage progressing direction

RUBBING MACHINE WITH REALIGNING FUNCTIONS OF RUBBING CLOTH FOR USE IN LCD MANUFACTURING PROCESS AND RUBBING METHOD USING THE SAME

BACKGROUND OF THE INVENTION

1. Field of the Invention

The present invention relates to a rubbing machine for use in a liquid crystal display manufacturing process. More particularly, the present invention relates to a rubbing machine for use in a liquid crystal display manufacturing process, and also to a rubbing method which is conducted using the same, in which the rubbing machine has a realigning function of a rubbing cloth and is suitable for use in a rubbing process involved in the manufacture of a liquid crystal display panel and for use in the fabrication of equipment for manufacturing a liquid crystal display.

2. Description of the Prior Art

A rubbing process, in which an alignment film coated on a substrate is rubbed with a cloth and the like to determine the direction of alignment, is a critical process in an LCD manufacturing process. Recently, in addition to twisted nematic (TN) mode, various modes including in-plane switching mode, fringe field switching (FFS) mode, and optical compensated bend (OCB) mode were proposed and applied to products.

A common point between these modes is that rubbing directions of upper and lower substrates is parallel to each other (0° or 180°). This parallel rubbing is not a special case. Actually, the case where the rubbing directions of the upper and lower substrates are parallel to each other is rather predominating, and the TN mode where the rubbing directions of the substrates are 90° may be regarded as a special case.

In the case of the parallel rubbing, rubbing uniformity is a very important factor that is linked directly with image quality. Since IPS mode and FFS mode are designed as a normally black mode, images in a dark state are determined by the rubbing uniformity.

However, as shown in FIG. 1, it is difficult to achieve uniform rubbing conditions in the mass production concept, so that poor image quality significantly occurs due to rubbing non-uniformity.

In the mass production concept, the reason why the rubbing non-uniformity occurs is as follows.

A rubbing cloth is generally formed of a velvet-shaped cloth where short and thin piles are implanted on a base cloth. Also, the rubbing cloth is mainly made of cotton or rayon.

Rubbing of the alignment film is achieved by the piles implanted on the base cloth, which come in actual contact with the alignment film.

These piles have elastic force and restoring force so that they rub the substrate while exhibiting some buffer action even on the non-uniform portions of the alignment film and the substrate. However, in the mass production concept, there are large amounts of work that one rubbing cloth will perform. Thus, if non-uniformity at a fixed position is continued, it then exceeds the buffer limit of the rubbing cloth and affects the rubbing cloth, so that the surface of the rubbing cloth corresponding to that portion will be non-uniform.

Accordingly, as the rubbing working progresses, rubbing of the substrates that are rubbed later becomes increasingly non-uniform. Thus, in the case of the parallel rubbing, the amount of work conducted by one rubbing cloth is significantly limited as compared to TN mode.

Meanwhile, there are innumerable non-uniform factors that can occur during a process. These factor include non-uniformity of a rubbing state, glass edges, TFT patterns and lines formed in an array, pixels and black matrixes of a color filter, and column spacers. In this case, a problem is that they are factors necessary for LCD panels. Thus, eliminating such factors to solve the rubbing non-uniformity is not possible.

Meanwhile, once a new rubbing cloth is attached on a rubbing roll, it is subjected to an aligning step of rubbing several times a test substrate (dummy substrate) such as a glass substrate, before it is applied for a mass production process. This aligning step is generally called "aging technique", i.e., a realignment technique of the rubbing cloth. It was found that this aging technique was effective even in realigning the rubbing cloths having non-uniformity occurred at the start and middle of a process.

Moreover, this realignment technique of the rubbing cloth is highly effective in lengthening the life span of the rubbing cloth and in maintaining higher process quality.

As shown in FIG. 2, the realignment technique of the rubbing cloth is one in which several or several tens of mass production substrates A are rubbed and one or several sheets of realigning substrates, such as a glass substrate having a flat surface, are then rubbed.

By these realigning substrates inserted between the mass production substrates contributing to non-uniformity, the rubbing cloth whose non-uniformity have been deepened is reduced to an initial condition of a process.

Furthermore, in applying this realignment technique of the rubbing cloth, inserting the realigning substrates B between the mass production substrates A is a troublesome operation, and the realigning substrates B are mixed with the mass production substrates A so that poor image quality can be caused.

As a result, as long as a rubbing machine has a function capable of realigning the rubbing cloth by itself without separately inserting the realigning substrates B, the problem of causing the poor image quality can be solved.

SUMMARY OF THE INVENTION

Accordingly, the present invention has been made to solve the above-mentioned problems occurring in the prior art, and an object of the present invention is to provide a rubbing machine with realigning functions for use in an LCD manufacturing process, and a rubbing method using the same, by which the poor image quality caused by the non-uniformity of the rubbing cloth can be solved, a margin for the rubbing process can be increased, and a rubbing cloth can be used for a longer period of time.

To achieve the above object, in one aspect, the present invention provides a rubbing machine with realigning functions for use in an LCD manufacturing process, which is used to determine the direction of alignment by rubbing an alignment film coated on a substrate disposed on a stage, the rubbing machine being characterized in that an realigning section for realigning a rubbing cloth is disposed on the portion of a rubbing roll in such a manner that the realigning section is in contact with the rubbing cloth.

In the rubbing machine according to the present invention, the realigning section is preferably formed in a circular arc shape for increasing a contact area between the realigning section and the rubbing cloth, or it is formed into a stick pad shape.

Also, the realigning section is preferably formed in two parts or more, or the contact area of the realigning section is divided into two parts or more, such that the contact area can be adjusted.

Moreover, the portion of the realigning section coming in contact with the rubbing cloth is preferably formed in a curved shape.

Furthermore, the realigning section is disposed in the form of a curved pad on the stage for fixing the substrate.

In another aspect, the present invention provides a rubbing method which is conducted using a rubbing machine which is used to determine the direction of alignment by rubbing an alignment film coated on a substrate disposed on a stage, the method comprising the steps of: inserting a realigning test substrate between mass production substrates; disposing a realigning section on a rubbing cloth attached on a rubbing roll; and rubbing the substrates by running the rubbing roll on the substrate under a desired pressure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a rubbing machine with realigning functions for use in an LCD manufacturing process and a rubbing method using the same will be described in further detail with reference to the accompanying drawings.

Figure 1:
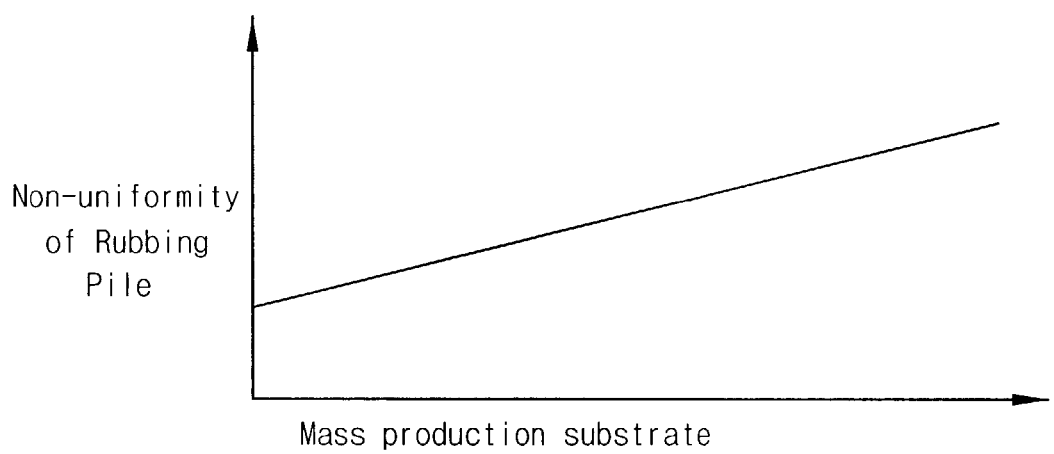
FIG. 1 is a drawing showing that the non-uniformity of a rubbing cloth according to mass production substrates occurs, in a rubbing machine for use in an LCD manufacturing process according to the prior art and a rubbing method using the same.
Figure 2:
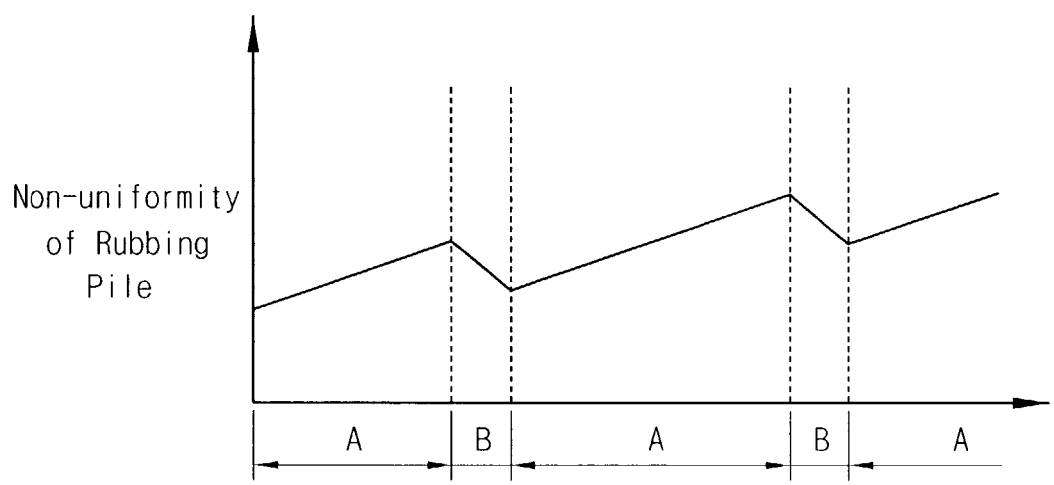
FIG. 2 is a drawing showing that the non-uniformity of rubbing cloth occurs when a realigning substrate was inserted between a plurality of mass production substrates, in a rubbing machine for use in an LCD manufacturing process according to the prior art and a rubbing method using the same.
Figure 3:
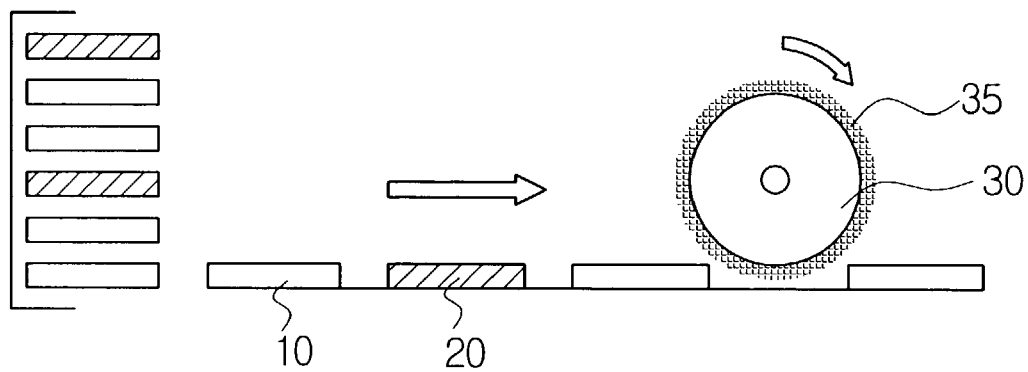
FIG. 3 is a drawing showing that a rubbing roll runs on mass production substrates and realigning substrates, according to one embodiment of the present invention.

As shown in FIG. 3, in order to realign a rubbing cloth, realigning test substrates 20 are first inserted between several mass production substrates 10. At this time, the number of the realigning test substrates 20 and a material of forming the test substrates can be suitably selected without departing the sensible scope of the present invention.

Moreover, the rubbing machine is formed in such a manner that the rubbing roll 30 having a rubbing cloth 35 attached thereon rotates while it runs on the substrates 10 under a desired pressure. In this case, since the portion of the rubbing cloth 35 coming in contact with the substrates 10 corresponds to the portion of the roll 30, the remaining portion of the rubbing cloth can be sufficiently realigned.

Figure 4:
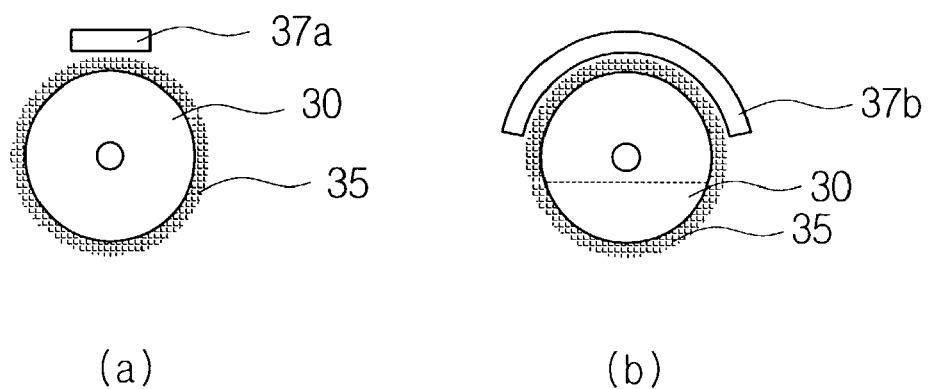
FIG. 4 is a drawing illustrating one embodiment of the present invention in which a realigning section is formed on a rubbing cloth of a rubbing roll in a general pad shape and circular arc shape.

As shown in FIG. 4, a realigning section 37 for realigning the rubbing cloth is attached on the portion of the rubbing roll 30. In this case, although the realigning section may be made of any material capable of exhibiting a realigning effect, it is preferably made of the same material as that of the substrate. Also, the shape and area of the rubbing roll may be selected without departing the sensible scope of the present invention. Namely, as shown in FIG. 4, it can be formed in a circular arc shape 37b having an area larger than that of a general pad shape 37a.

The realigning section 37 is a section serving to realign the piles of the rubbing cloth by contacting with the rubbing cloth. The realigning section 37 may be formed in a stick pad shape. Although the portion of the realigning section 37 coming in contact with the rubbing cloth 35 may be made of any possible material, it is preferably made of a material equal or similar to that of the substrates.

Moreover, the realigning effect may be adjusted depending on a contact pressure and a contact area between the realigning section 37 and the rubbing cloth 35 and also on a rubbing cloth depth (i.e., interval by which the contact face of the realigning section presses the pile tip of the rubbing cloth).

Thus, it is preferred to attach means for adjusting the contact pressure and area of the realigning section 37.

In order to increase the contact area, there can be used a method in which the realigning section 37 is formed in a circular arc shape other than a simple stick pad shape, such that it can be disposed around the portion of the roll. Alternatively, in order to adjust the contact area, the realigning section is formed in two parts or more, such that the contact area can be adjusted according to the number of the applied realigning sections, if required.

Figure 5:
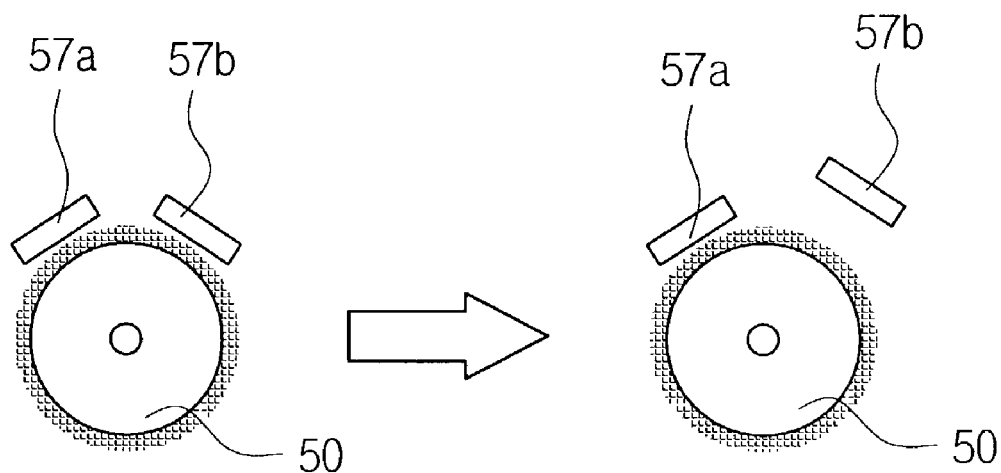
FIG. 5 is a drawing illustrating another embodiment of the present invention in which a realigning section formed in two parts or more or having two divided contact areas.

Meanwhile, FIG. 5 shows another example of the present invention. As shown in FIG. 5, a realigning section of a rubbing roll 50 is formed in two parts 57a and 57b, or a contact area of the realigning section is divided into two parts or more, such that the contact area can be adjusted, if required.

However, possible step heights of the rubbing cloth can cause damage to the rubbing cloth and also possible step heights of the rubbing cloth-realigning pad can cause damage to the rubbing cloth. Thus, because of the step height of the realigning pad, the non-uniformity of the rubbing cloth can occur and the life span of the rubbing cloth can be reduced.

Figure 6:
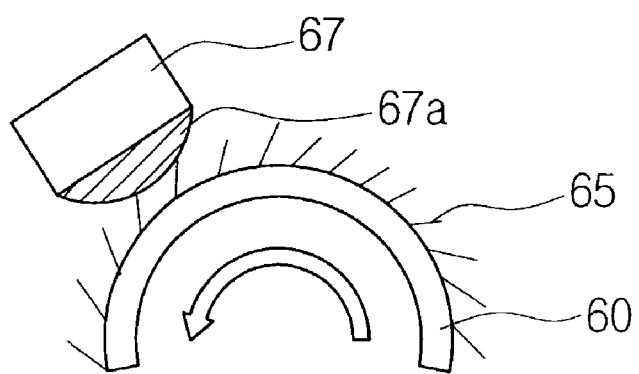
FIG. 6 is a drawing illustrating another embodiment of the present invention in which the portion of the realigning section coming in contact with the rubbing cloth is formed in a curved shape.

For this reason, in order to solve the shortcomings which can occur in the above embodiment of the present invention, the realigning section 67 can be formed in a curved shape 67a with no step height, as shown in FIG. 6 showing another example of the present invention. As a result, since the curved shape 67a has no step height, the problems of the non-uniformity of the rubbing cloth and the life span reduction of the rubbing cloth, which are caused by the realigning pad, are eliminated. In FIG. 6, the reference numeral 60 indicates a rubbing roll, and the reference numeral 65 indicates a rubbing cloth.

Figure 7:
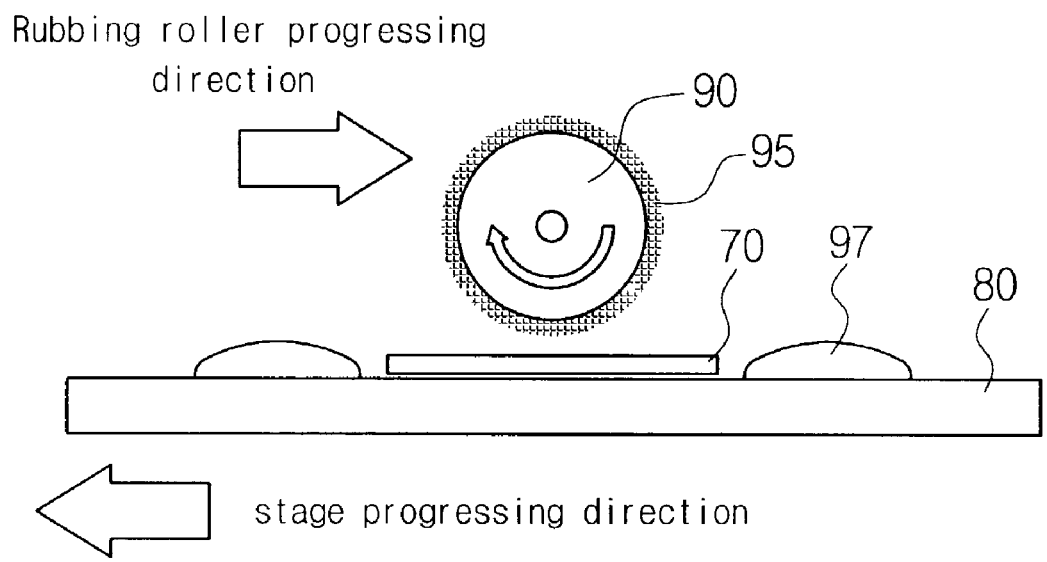
FIG. 7 is a drawing illustrating another embodiment of the present invention in which a realigning section is attached on a stage for fixing a substrate.

Meanwhile, FIG. 7 shows another example of the present invention. As shown in FIG. 7, a realigning pad 97 is disposed on a stage 80 for fixing a substrate 70. In this case, the same effect as described in the above embodiments is obtained, since a rubbing roll 90 or the stage 80 having a substrate 70 fixed thereon runs so that the rubbing cloth 95 comes in contact with the entire surface of the substrate 70.

As apparent from the foregoing, the rubbing machine with realigning functions for use in the LCD manufacturing process and the rubbing method using the same according to the present invention has the following effects.

Namely, according to the present invention, the poor image quality caused by the non-uniformity of the rubbing cloth can be solved, a margin for the rubbing process can be increased, and the rubbing cloth can be used for a longer period of time.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A rubbing machine which is used to determine the direction of alignment by rubbing an alignment film coated on a substrate disposed on a stage, the rubbing machine comprising:
    a rubbing roll having a rubbing cloth disposed on a portion of the rubbing roll; and
    a realigning section for realigning the rubbing cloth, wherein the realigning section is in contact with the rubbing cloth.

2. The rubbing machine of claim 1, in which the realigning section is formed in a circular arc shape for increasing a contact area between the realigning section and the rubbing cloth, or it is formed in a stick pad shape.

3. The rubbing machine of claim 1, in which the realigning section is formed in two parts or more, or the contact area of the realigning section is divided into two parts or more, such that the contact area can be adjusted.

4. The rubbing machine of claim 1, in which the portion of the realigning section coming in contact with the rubbing cloth is formed in a curved shape.

5. The rubbing machine of claim 1, in which the realigning section is disposed in the form of a curved pad on the stage for fixing the substrate.

6. The rubbing method of claim 1, wherein the realigning section is made from the same material as the substrate.

7. A rubbing method that is carried out using a rubbing machine which is used to determine the direction of alignment by rubbing an alignment film coated on a substrate disposed on a stage, the method comprising the steps of:
    inserting a realigning test substrate between mass production substrates;
    disposing a realigning section on a rubbing cloth attached on a rubbing roll
        wherein the rubbing roll has the rubbing cloth disposed on a portion of the rubbing roll, and
        wherein the realigning section for realigning the rubbing cloth is in contact with the rubbing cloth; and
    rubbing the substrates by running the rubbing roll on the substrates under a desired pressure.

8. The rubbing method of claim 7, in which the realigning section is formed in a circular arc shape for increasing a contact area between the realigning section and the rubbing cloth, or the realigning section is formed in a stick pad shape.

9. The rubbing method of claim 7, in which the portion of the realigning section coming in contact with the rubbing cloth is formed in a curved shape.

10. The rubbing method of claim 7, in which the realigning section is disposed on the stage for fixing the substrate in the form of a curved pad.

11. The rubbing method of claim 7, wherein the realigning section is made from the same material as the substrate.

* * * * *